United States Patent [19]

Zwick et al.

[11] Patent Number: 5,582,480
[45] Date of Patent: Dec. 10, 1996

[54] LIGHT ASSEMBLY FOR MOTOR VEHICLES

[75] Inventors: Hubert Zwick, Stuttgart; Gernot M. Bracht, Pforzheim, both of Germany

[73] Assignee: Reitter & Schefenacker GmbH & Co. KG, Esslingen, Germany

[21] Appl. No.: 444,430

[22] Filed: May 19, 1995

[30] Foreign Application Priority Data

May 20, 1994 [DE] Germany .................. 44 17 695.3

[51] Int. Cl.⁶ ..................................................... F21V 7/00
[52] U.S. Cl. .................... 362/298; 362/299; 362/303; 362/305; 362/329; 362/343
[58] Field of Search ................................ 362/298, 299, 362/303, 305, 329, 343

[56] References Cited

U.S. PATENT DOCUMENTS

| | | | |
|---|---|---|---|
| 2,469,412 | 5/1949 | Roebken | 362/298 |
| 4,037,096 | 7/1977 | Brendgord et al. | 362/298 |
| 4,897,771 | 1/1990 | Parker | 362/298 |

*Primary Examiner*—Denise Gromada
*Assistant Examiner*—Alfred Basichas
*Attorney, Agent, or Firm*—Robert W. Becker & Associates

[57] ABSTRACT

A light assembly for a motor vehicle has a housing and a transparent plate closing off the housing. At least one light-emitting device is positioned in the housing for illuminating the transparent plate. At least one main reflector is positioned in the housing for reflecting light emitted by the light-emitting device to the transparent plate. A prism is positioned in the housing so as to be placed at least partially in the path of the light emitted by the light-emitting device, whereby the prism reflects the light impinging thereon to the main reflector so as to be reflected onto the transparent plate.

18 Claims, 4 Drawing Sheets

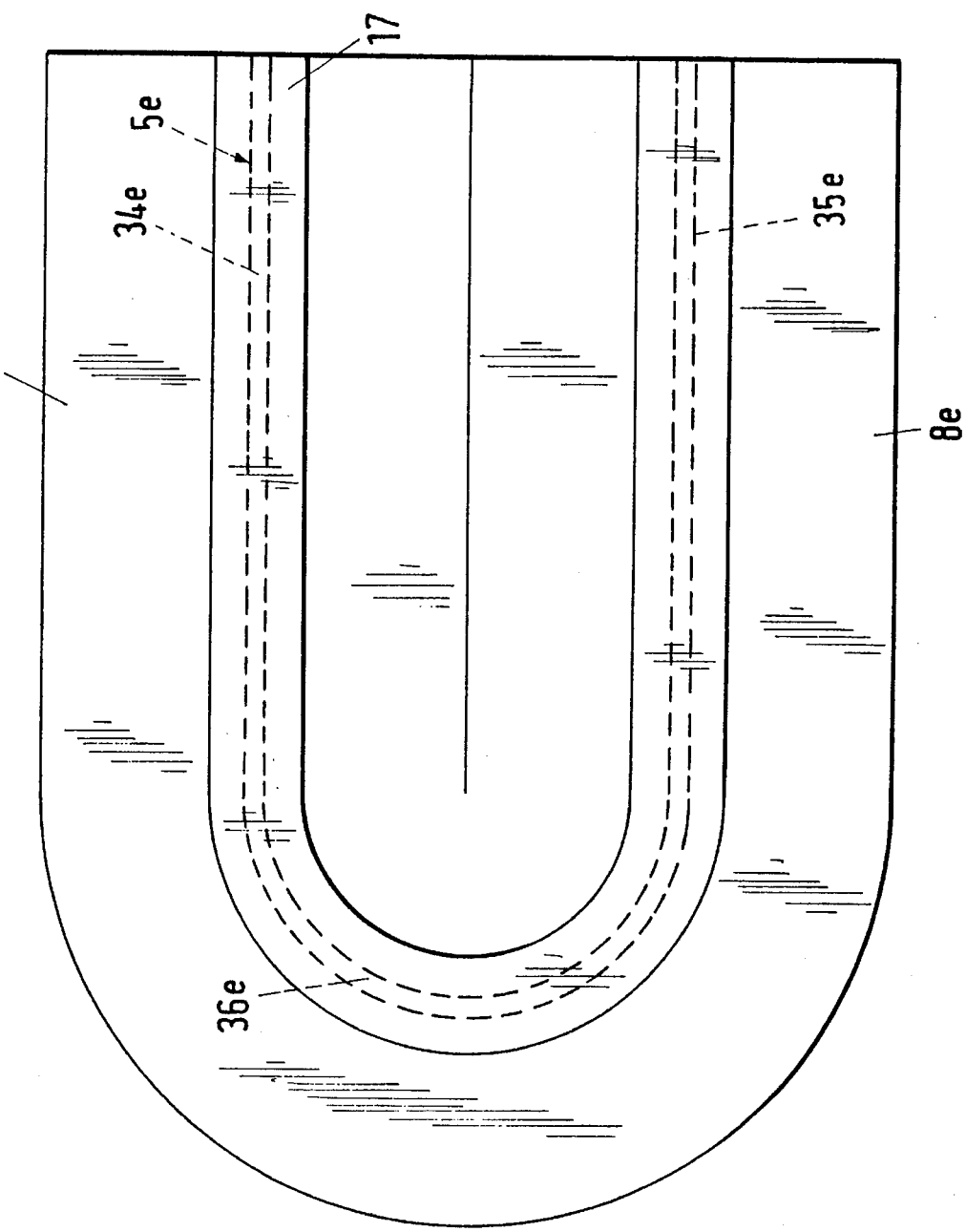
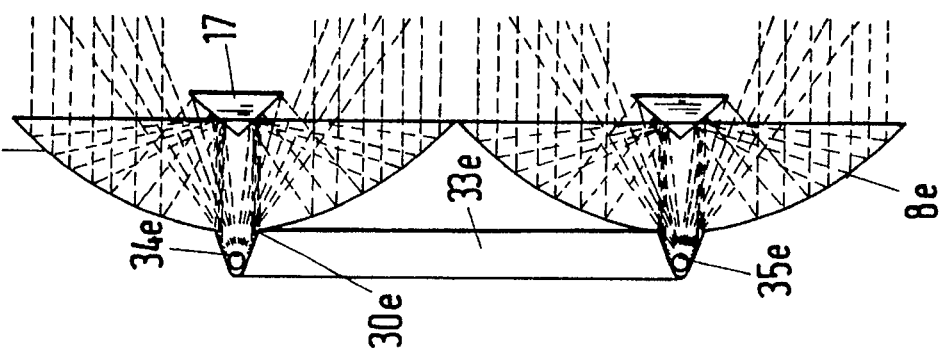

LIGHT ASSEMBLY FOR MOTOR VEHICLES

BACKGROUND OF THE INVENTION

The present invention relates to a light assembly for motor vehicles comprising a housing in which at least one light-emitting device and at least one reflector is arranged which reflector together with the light-emitting device is positioned behind a transparent plate.

In known light assemblies for motor vehicles the light emitted by an incandescent light bulb impinges on a reflector which reflects the light rays toward the transparent plate. In order to achieve a uniform illumination of the transparent plate, the reflector requires a complicated design.

It is therefore an object of the present invention to improve a light assembly for motor vehicles of the aforementioned kind such that with a simple design of the light assembly the transparent plate is uniformly illuminated.

SUMMARY OF THE INVENTION

The light assembly for a motor vehicle according to the present invention is primarily characterized by:

A housing;

A transparent plate closing off the housing;

At least one light-emitting device positioned in the housing for illuminating the transparent plate;

At least one main reflector positioned in the housing for reflecting light emitted by the light-emitting device to the transparent plate;

A prism positioned in the housing so as to be placed at least partially in the path of the light emitted by the light-emitting device, the prism reflecting the light impinging thereon to the main reflector so as to be reflected onto the transparent plate.

Preferably, the light assembly further comprises at least one additional reflector positioned in the housing, wherein the prism reflects a portion of the light impinging thereon to the at least one additional reflector so as to be reflected onto the transparent plate. Preferably, two of the additional reflectors are provided. The prism is positioned such that the light emitted by the light-emitting device impinges on two sides of the prism and each one of the two sides of the prism has one of the additional reflectors coordinated therewith.

Advantageously, the at least one additional reflector overlaps the main reflector when viewing the light assembly from the transparent plate.

Expediently, the at least one additional reflector is arranged relative to the main reflector and the prism such that a portion of the light emitted by the light-emitting device is directly reflected by the main reflector to the transparent plate.

Preferably, the sides of the prism positioned in the path of the light of the light-emitting device have a mirror surface.

Preferably, a side of the prism facing the transparent plate has a reflector optic.

Advantageously, the prism is spaced from the transparent plate.

In a preferred embodiment of the present invention the prism and the transparent plate together form a unitary part.

Preferably, the housing has a chamber in which the light-emitting device is positioned and the prism extends over the entire length of the chamber.

Advantageously, the prism is positioned at the same level as the light-emitting device.

Preferably, the main reflector has an opening and the light-emitting device is positioned on a side of the reflector facing away from the transparent plate such that the light emitted by the light-emitting device passes through the opening. Preferably, the main reflector comprises a light-refracting optic positioned in the opening.

In a preferred embodiment of the present invention the light passing through the opening impinges at least partially on the prism and is reflected by the prism onto the main reflector. Advantageously, a portion of the light passing through the opening impinges directly on the transparent plate.

The light-emitting device may be an incandescent light bulb, at least one LED, or a neon light.

According to the present invention a portion of the reflected light rays impinges on the prism which reflects the light rays to the main reflector which, in turn, deflects the light rays to the transparent plate. By interposing a prism in the path of the light emitted by the light-emitting device, a simple constructive design is provided that results in an improved uniform illumination of the transparent plate.

BRIEF DESCRIPTION OF THE DRAWINGS

The object and advantages of the present invention will appear more clearly from the following specification in conjunction with the accompanying drawings, in which:

FIG. 8 shows an end view of a portion of a further embodiment of the inventive light assembly; and FIG. 9 shows a longitudinal section of the light assembly of FIG. 8.

DESCRIPTION OF THE PREFERRED EMBODIMENT

The present invention will now be described in detail with the aid of several specific embodiments utilizing FIGS. 1 through 9.

Figure 2:
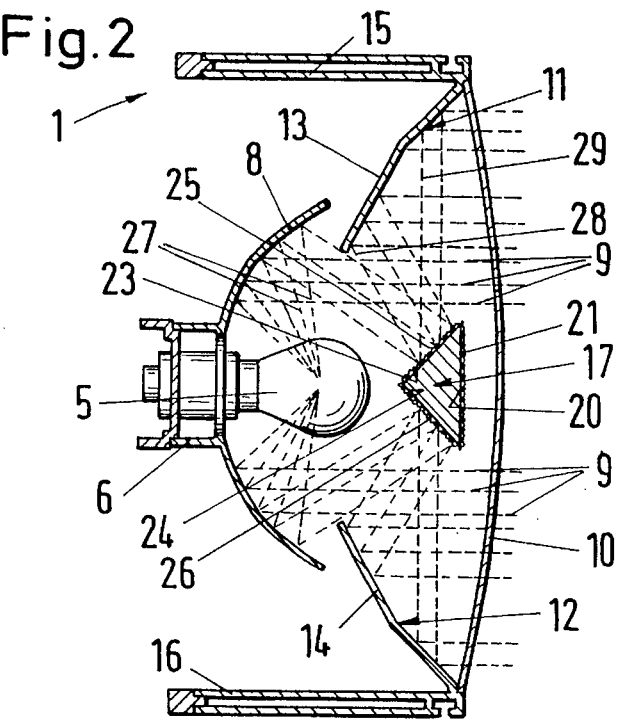
FIG. 2 shows a section along the line II—II of FIG. 1.
Figure 1:
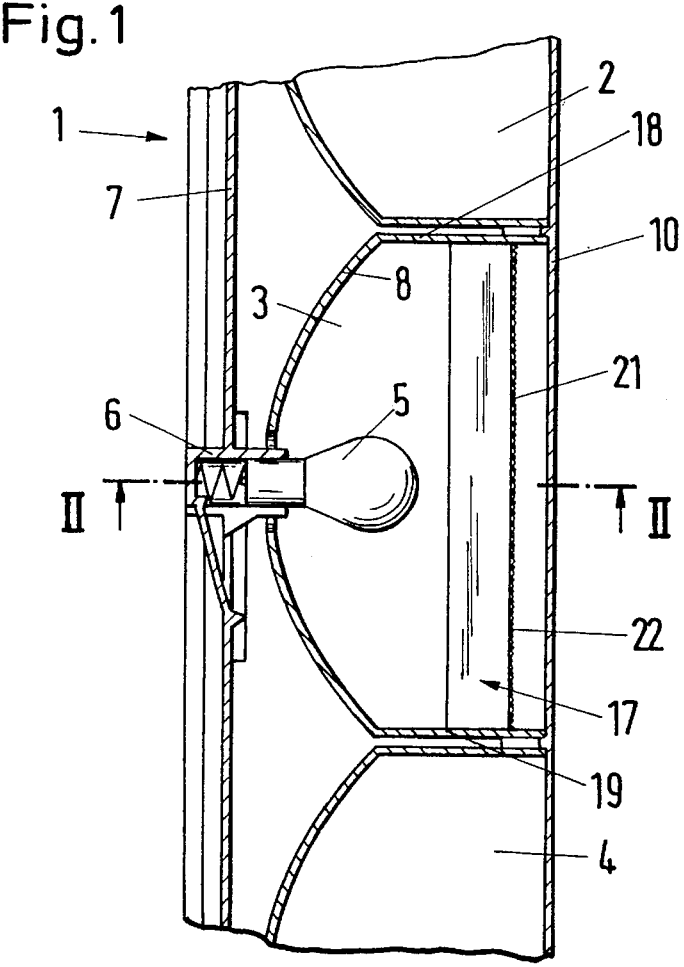
FIG. 1 shows a longitudinal section of a part of the inventive light assembly for a motor vehicle.
Figure 3:
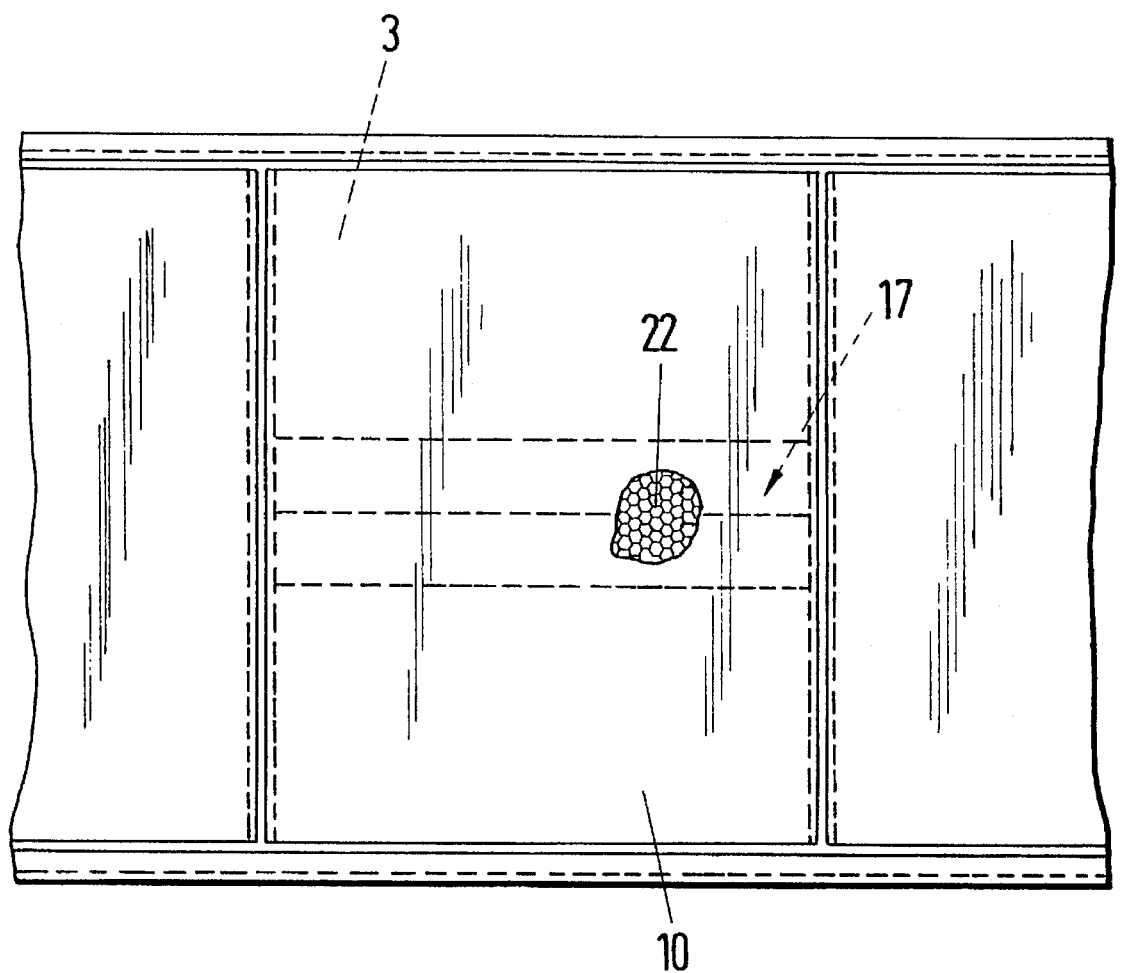
FIG. 3 shows an end view of the light assembly of FIG. 1.

The light assembly for a motor vehicle in the embodiment of FIG. 1 is a tail light comprising a housing 1 in which adjacent to one another four separate chambers 2 to 4 are provided. Each chamber contains therein an incandescent light bulb 5 of which only one is shown in FIG. 1 and FIG. 2. The light bulb 5 is positioned in a manner known per se in a socket 6 which is arranged at the back wall 7 of the housing 1. The other light bulbs 5 are fastened in an identical manner in the other chambers.

The light bulb 5 of the chamber 3 is surrounded partially by a main reflector 8 which reflects the light rays emitted by the light bulb 5. The main reflector 8 can have in cross-section an elliptical, parabolic etc. shape or may also be freely shaped as desired. As shown in FIG. 2, a portion 9 of the light rays coming from the main reflector 8 are reflected toward the transparent plate 10 that covers the housing 1 at its forward end. In the area between the transparent plate 10 and the main reflector 8 two additional reflectors 11, 12 (FIG. 2) are provided which may be comprised of planar mirror surfaces 13, 14. The additional reflectors 11, 12, however, may also have a correspondingly curved cross-section. As shown in FIG. 2, the additional reflectors 11, 12 extend from the upper and lower edge of the transparent plate 10 into the chamber 3. The additional reflectors 11, 12 are connected to side walls 15, 16 and advantageously are formed as a unitary part thereof. Via the side walls 15, 16 the additional reflectors 11, 12 are connected to the housing 1, preferably to its edge.

The additional reflectors 11, 12 extend to such an extent into the chamber 3 (FIG. 2) that in a view onto the transparent plate 10, they overlap to a small extent the main reflector 8.

In the area between the light bulb 5 and the transparent plate 10 a prism 17 is provided at the level of the light bulb 5 which extends over the entire length of the chamber 3 and abuts the side walls 18, 19 of the chamber 3 (FIG. 1). The prism 17 extends within the chamber 3 so as to be spaced at a short distance from the transparent plate 10. It is comprised advantageously of a suitable plastic material. As an alternative to the represented embodiment, the prism 17 may also be a unitary part of the transparent plate 10. The planar prism side 20 facing the transparent plate 10 may be provided with a reflector optic 21. This reflector optic 21 is comprised of individual small prisms 22, preferably in the form of triple prisms. Such a design of the prism 17 has the advantage that no additional separate surface must be provided for a rear reflector because the prism side 20 can be used for this purpose.

The two other sides 23 and 24 of the prism 17, which is triangular in cross-section, are provided with mirror surfaces 25 and 26 with which the light rays impinging on the prism 17 are refracted into at least two light rays each. As shown in FIG. 2, a portion 27 of the light emitted by the light bulb 5 impinges after reflection at the reflector 8 onto the mirror surfaces 25, 26 of the prism 17. From there the partial light rays are reflected to the additional reflectors 11, 12 whereby these light rays are refracted into two partial rays 28 and 29. Both partial rays 28, 29 impinge on the additional reflectors 11, 12 which then reflect these partial rays in a direction toward the transparent plate 10.

The main reflector 8, the prism 17, and the additional reflectors 11, 12 are embodied such that all of the partial light rays 9, 28, 29 pass in parallel relative to one another through the transparent plate 10. Thus, the transparent plate 10 is uniformly illuminated over its height and width whereby a portion 9 of the light rays emitted by the light bulb 5 is directly reflected by the main reflector 8 to the transparent plate 10 and another portion 27 to 29 is reflected by the main reflector 8 via the prism 17 and the additional reflectors 11, 12 to the transparent plate 10.

It is possible to embody the mirror surfaces 25, 26 at the prisms sides 23, 24 such that the portion 27 of the light rays is not refracted at the mirror surfaces 25, 26 but is simply reflected to the additional reflectors 11, 12.

The prism 17 is preferably arranged within the chamber 3 in which a red signal color of the light assembly is to be generated. The prism 17 can however extend over the entire length of the light assembly. In this case, the side 20 of the prism 17 facing the transparent plate 10 is of a neutral color adjacent to the area of the light assembly which generates the red light. In these adjacent areas the prism side 20 may have the same color as the paint of the motor vehicle. Since the reflector optic 21 is no longer provided at the transparent plate 10 but at the prism 17, the light assembly thus has a uniform visual appearance. The individual areas of the transparent plate 10 corresponding to the individual signal lights can be provided with a corresponding coloring so that the transparent plate 10 is divided into sections of different colors. However, it is also possible to color the transparent plate 10 with a uniform color and to interpose in the path of the light within the light assembly a filter that upon actuation of the respective light bulb 5 generates the corresponding signal color of the transparent plate. In any case, there is no light optic visible on the transparent plate 10.

Instead of a light bulb 5 it is also possible to use any other suitable light-emitting device, such as a neon light or at least one LED (light-emitting diode).

Figure 4:
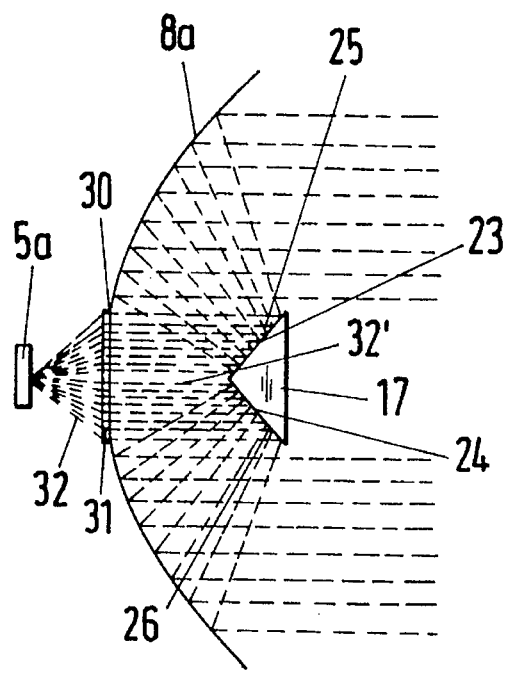
FIGS. 4 to 7 each show a representation corresponding to FIG. 2 of further embodiments of the inventive light assembly.

In the embodiment according to FIG. 4 the light-emitting device is in the form of a LED 5a which is positioned on a side of the main reflector 8a facing away from the transparent plate (not represented).

As in the previous embodiment, the reflector 8a can have in cross section an elliptical, parabolic etc. shape or can have free-formed surfaces. The main reflector 8a has an opening 30 in which a light-refracting optic 31 is arranged. The light emitted by the LED 5a impinges on the light-refracting optic 31 with which the diverging rays 32 are refracted into parallel rays 32'. These parallel rays 32' impinge on the prism sides 23 and 24 of the prism 17 that is positioned on a side of the main reflector 8a facing the transparent plate so as to be spaced from the optic 31. The dimensions of the prism 17 are selected with respect to the dimensions of the optic 31 such that all of the rays 32' passing through the optic 31 impinge on the prism sides 23 and 24. The prism sides 23, 24, as in the previous embodiment, are provided with mirror surfaces 25 and 26 that are designed such that the parallel rays 32' are reflected to the main reflector 8a. At the main reflector 8a the rays are reflected toward the non-represented transparent plate of the light assembly. The arrangement is designed such that the rays reflected by the main reflector 8a toward the transparent plate are parallel to one another. The prism 17 is arranged symmetrically with respect to the optic 31 such that onto both prism sides 23, 24 the same amount of rays 32' will impinge.

The mirror surfaces 25, 26 of the prism sides 23, 24, as disclosed in the previous embodiment, may be embodied such that the light rays 32' impinging on the prism 17 are refracted into at least two light rays each to be reflected to the main reflector 8a. Otherwise, the prism 17 can be embodied as previously disclosed. With the prism 17 an optimal illumination of the transparent plate is achieved in a simple manner.

The light assembly may be provided with a plurality of main reflectors 8a for distributing the light. The transparent plate itself does not require any lenses, deflecting elements etc. so that it may be of a simple construction. The LED 5a is positioned behind the prism 17 so that the light-emitting device is not visible from the exterior.

Figure 5:
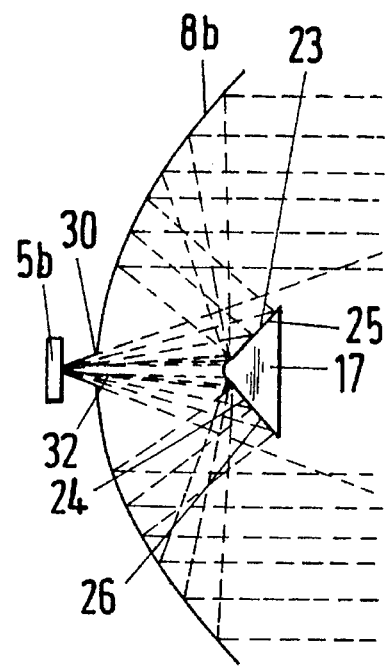

In the embodiment according to FIG. 5 the light-emitting device is again in the form of a LED 5b the rays 32 of which pass through the opening 30 of the main reflector 8b. In contrast to the previous embodiment a light-refracting optic is not provided. The light rays 32 diverging from the LED 5b thus impinge partly on the prism 17 after passing through the opening 30 and are reflected at its prism surfaces 23 and 24 to the main reflector 8b. At the main reflector 8b the rays are again reflected so that they impinge in parallel on the transparent plate (light window). The prisms sides 23, 24 are provided with corresponding mirror surfaces 25 and 26.

Since the rays 32 extend in a diverging fashion from the LED 5b, a portion of the rays 32 does not impinge on the prism 17 but reaches without being reflected directly the transparent plate.

This embodiment also ensures an optimal illumination of the transparent plate over its entire height and width. The prism 17 can otherwise be embodied as disclosed in connection with the embodiment of FIGS. 1 to 3.

Figure 6:
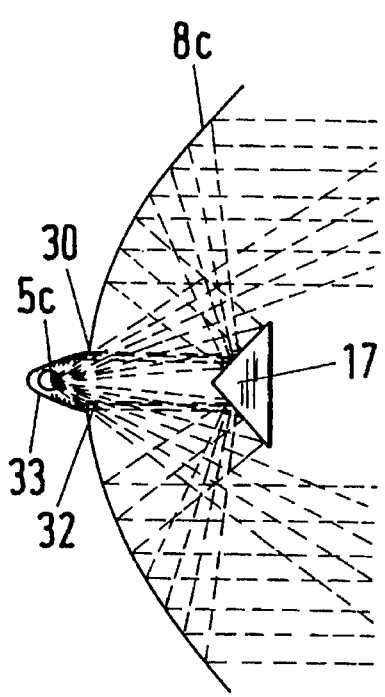

The embodiment of FIG. 6 differs from the embodiment of FIG. 5 only in that the light-emitting device 5c is a rod-shaped neon light. The light rays 32 emitted by the light 5c pass through the opening 30 of the main reflector 8c and impinge partly on the prism 17. The other portion of the rays 32 impinges directly on the non-represented transparent plate of the light assembly. The neon light 5c is surrounded by an auxiliary reflector 33 that is positioned on a side of the main reflector facing away from the prism 17 and extends about the opening 30 of the main reflector 8c. This reflector 33 may have in cross-section a cylindrical, parabolic etc. shape. With this auxiliary reflector 33 it is ensured that the light emitted by the neon light 5c is completely reflected through the opening 30 of the reflector 8c.

Figure 7:
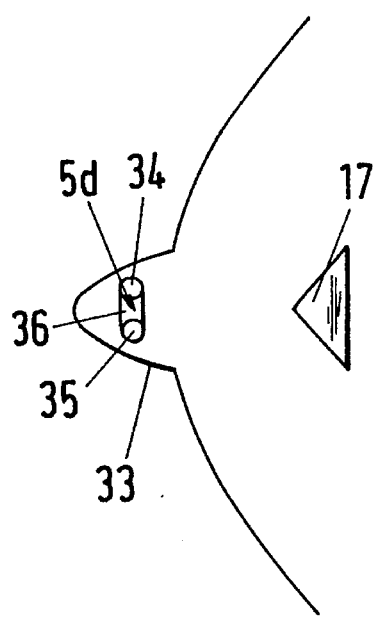

FIG. 7 shows an embodiment in which the light-emitting device 5d is a U-shaped neon light. The neon light 5d has two legs 34 and 35 that are connected by a curved connector piece 36. The legs 34, 35 of the neon light 5d extend parallel to the longitudinal axis of the prism 17. The neon light 5d is arranged within the auxiliary reflector 33 which is embodied identical to the previously described embodiment.

In order to simplify the drawing, the light rays emitted by the neon light 5d are not represented in FIG. 7. The path of the light rays corresponds to that represented in FIG. 6. Otherwise, the embodiment of FIG. 7 is identical to the embodiment of FIG. 6.

FIGS. 8 and 9 show a portion of a light assembly for a motor vehicle which comprises a light-emitting device again in the form of a U-shaped neon light 5e. The neon light 5e comprises two parallel legs 34e, 35e which are connected to one another by a curved connecting piece 36e. On the side of the main reflector 8e which is facing away from the prism 17 the neon light 5e is surrounded by a U-shaped auxiliary reflector 33e that is formed so as to match the U-shaped design of the neon light 5e. The auxiliary reflector 33e surrounds the neon light 5e over its entire length. In cross section, the auxiliary reflector 33e can be part-cylindrical, parabolic etc.

The prism 17 has also a corresponding U-shaped form (FIG. 8) so that it extends over the entire length of the light 5e in the direction of light emission of the neon light 5e.

The main reflector 8e is also U-shaped. As shown in FIGS. 8 and 9, the edges of the main reflector 8e facing one another abut one another linearly. Otherwise, the main reflector 8e in cross-section is embodied identical to the previous embodiments.

The opening 30e, through which the light rays emitted by the neon light 5e pass, extends also in a U-shaped fashion. Thus, the light emitted over the length of the neon light 5e passes through this U-shaped opening 30e within the main reflector 8e and impinges partly on the U-shaped prism. The other portion of the light rays impinges directly on the transparent plate (not represented). The path of the emitted light is identical to the path in the embodiment of FIG. 6.

The neon light and thus also the prism 17 can have any other desired shape instead of the U-shaped embodiment shown in the Figures, for example, an annular, W-shaped, S-shaped spiral or wave-shaped design. It is of course also possible that the edges of the U-shaped main reflector 8e are spaced at a distance to one another.

The light-emitting device may be in the form of incandescent light bulbs, LEDs and neon lights, but, of course, it is also possible to use glass or fiber-optical light guides (wave guides). The present invention is, of course, in no way restricted to the specific disclosure of the specification and drawings, but also encompasses any modifications within the scope of the appended claims.

What we claimed is:

1. A light assembly for a motor vehicle, said light assembly comprising:

a housing;

a transparent plate closing off said housing;

at least one light-emitting device positioned in said housing for illuminating said transparent plate;

at least one main reflector positioned in said housing for reflecting light emitted by said light-emitting device to said transparent plate;

a prism positioned in said housing so as to be placed at least partially in the path of the light emitted by said light-emitting device, said prism reflecting the light impinging thereon to said main reflector so as to be reflected onto said transparent plate.

2. A light assembly according to claim 1, further comprising at least one additional reflector positioned in said housing, wherein said prism reflects a portion of the light impinging thereon to said at least one additional reflector so as to be reflected onto said transparent plate.

3. A light assembly according to claim 2, wherein:

two of said additional reflectors are provided;

said prism is positioned such that the light emitted by said light-emitting device impinges on two sides of said prism; and each one of said two sides of said prism has one of said two additional reflectors coordinated therewith.

4. A light assembly according to claim 2, wherein said at least one additional reflector overlaps said main reflector, when viewing said light assembly from said transparent plate.

5. A light assembly according to claim 2, wherein said at least one additional reflector is arranged relative to said main reflector and said prism such that a portion of the light emitted by said light-emitting device is directly reflected by said main reflector to said transparent plate.

6. A light assembly according to claim 1, wherein sides of said prism positioned in the path of the light of said light-emitting light device have a mirror surface.

7. A light assembly according to claim 1, wherein a side of said prism facing said transparent plate has a reflector optic.

8. A light assembly according to claim 1, wherein said prism is spaced from said transparent plate.

9. A light assembly according to claim 1, wherein said prism and said transparent plate together form a unitary part.

10. A light assembly according to claim 1, wherein said housing has a chamber in which said light-emitting device is positioned and wherein said prism extends over the entire length of said chamber.

11. A light assembly according to claim 1, wherein said prism is positioned at the same level as said light-emitting device.

12. A light assembly according to claim 1, wherein said main reflector has an opening and wherein said light-emitting device is positioned on a side of said reflector facing away from said transparent plate such that the light emitted by said light-emitting device passes through said opening.

13. A light assembly according to claim 12, wherein said main reflector comprises a light-refracting optic positioned in said opening.

14. A light assembly according to claim 12, wherein the light passing through said opening impinges at least partially on said prism and is reflected by said prism onto said main reflector.

15. A light assembly according to claim 14, wherein a portion of the light passing through said opening impinges directly on said transparent plate.

16. A light assembly according to claim 1, wherein said light-emitting device is an incandescent light bulb.

17. A light assembly according to claim 1, wherein said light-emitting device is at least one LED.

18. A light assembly according to claim 1, wherein said light-emitting device is a neon light.

* * * * *